United States Patent
Linn et al.

(10) Patent No.: US 12,024,033 B2
(45) Date of Patent: Jul. 2, 2024

(54) SYSTEM FOR RECOVERING ELECTRICAL ENERGY FROM MECHANICAL ROTATIONAL ENERGY OF AN ELECTRIC MACHINE AND INVERTER ASSOCIATED WITH IMPAIRED BATTERY

(71) Applicant: Deere & Company, Moline, IL (US)

(72) Inventors: Eric R. Linn, Kindred, ND (US); Roger K. Amundson, West Fargo, ND (US); Christopher J. Tremel, West Fargo, ND (US)

(73) Assignee: Deere & Company, Moline, IL (US)

( * ) Notice: Subject to any disclaimer, the term of this patent is extended or adjusted under 35 U.S.C. 154(b) by 410 days.

(21) Appl. No.: 17/456,178

(22) Filed: Nov. 23, 2021

(65) Prior Publication Data
US 2023/0158897 A1    May 25, 2023

(51) Int. Cl.
*B60L 50/61*     (2019.01)
*H02P 27/08*    (2006.01)

(52) U.S. Cl.
CPC .............. *B60L 50/61* (2019.02); *H02P 27/08* (2013.01); *B60L 2240/421* (2013.01); *B60L 2240/423* (2013.01)

(58) Field of Classification Search
CPC .......... B60L 50/61; B60L 3/0084; B60L 7/14; B60L 7/10; B60L 2240/423; H02P 27/08
See application file for complete search history.

(56) References Cited

U.S. PATENT DOCUMENTS

| | | | | |
|---|---|---|---|---|
| 4,757,249 A | * | 7/1988 | Farber | H02J 7/1438 320/126 |
| 5,796,224 A | | 8/1998 | Hayashi et al. | |
| 5,842,534 A | * | 12/1998 | Frank | B60K 6/48 903/917 |

(Continued)

FOREIGN PATENT DOCUMENTS

| | | | | |
|---|---|---|---|---|
| AT | 522014 A1 | * | 7/2020 | ............. B60L 3/003 |
| JP | 3875208 B2 | * | 1/2007 | |

(Continued)

OTHER PUBLICATIONS

Ivan Župan et al., Power converter circuits for recuperation of the regenerative braking energy in rail vehicles, dated 2019, pp. 178-183.

(Continued)

*Primary Examiner* — Steve Clemmons

(57) ABSTRACT

An electric machine is coupled to at least the respective alternating current output terminal or to a plurality of alternating current output terminals of the inverter. The electric machine has a rotor with a rotational speed that is capable of converting rotational mechanical energy of the rotor into electrical energy at the direct current bus terminals until the rotational speed declines below a critical speed. In response to the detection of an impaired state of the battery, a controller is configured to provide control signals to switch or toggle the corresponding low-side switch or switches to manage the charging and discharging of the direct current (DC) bus voltage between a minimum DC voltage and a (Continued)

maximum DC voltage that define a range suitable for providing energy sufficient to power an electronic data processor and control logic of the controller.

12 Claims, 4 Drawing Sheets

(56) References Cited

U.S. PATENT DOCUMENTS

| | | | | |
|---|---|---|---|---|
| 6,038,500 | A * | 3/2000 | Weiss | B60W 10/06 |
| | | | | 701/41 |
| 8,040,096 | B2 | 10/2011 | Taniguchi | |
| 8,502,485 | B2 | 8/2013 | Kudanowski et al. | |
| 8,860,359 | B2 * | 10/2014 | Cao | B60L 58/22 |
| | | | | 320/167 |
| 9,093,940 | B2 | 7/2015 | Xu et al. | |
| 9,481,354 | B2 * | 11/2016 | Bae | B60L 50/15 |
| 9,998,056 | B2 | 6/2018 | Nozawa | |
| 11,894,791 | B2 * | 2/2024 | Hirakata | H02P 6/08 |
| 2011/0133546 | A1 * | 6/2011 | Jang | H02M 7/53871 |
| | | | | 327/419 |
| 2015/0298552 | A1 | 10/2015 | Ferrer-Dalmau Nieto et al. | |

FOREIGN PATENT DOCUMENTS

| | | | | |
|---|---|---|---|---|
| KR | 20130091258 | A * | 8/2013 | |
| WO | WO-2016034790 | A1 * | 3/2016 | B60L 1/003 |

OTHER PUBLICATIONS

Mark Fenger et al., Motor Winding Problems caused by inverter drives, IEEE Industry Applications Magazine, Jul.-Aug. 2003, pp. 22-31.

Extended European Search Report and Written Opinion issued in European Patent Application No. 22201582.8, dated Mar. 20, 2023, in 09 pages.

* cited by examiner

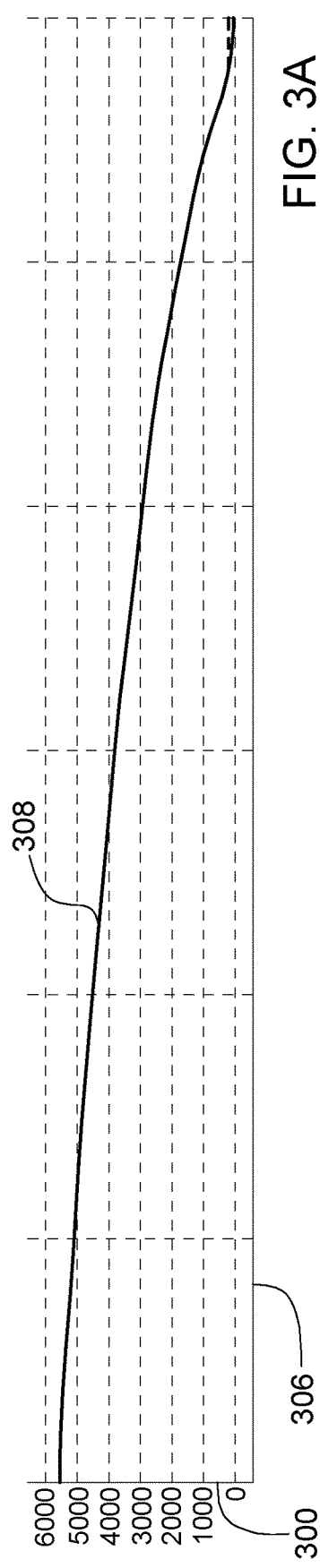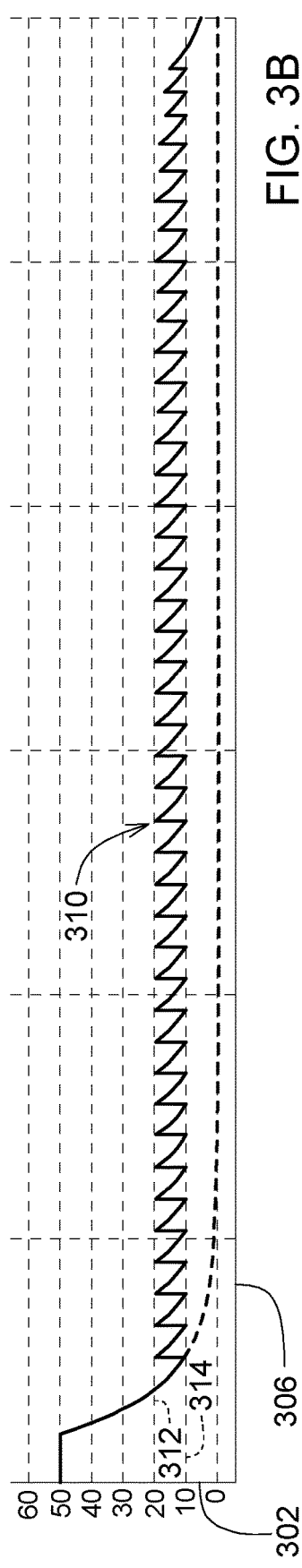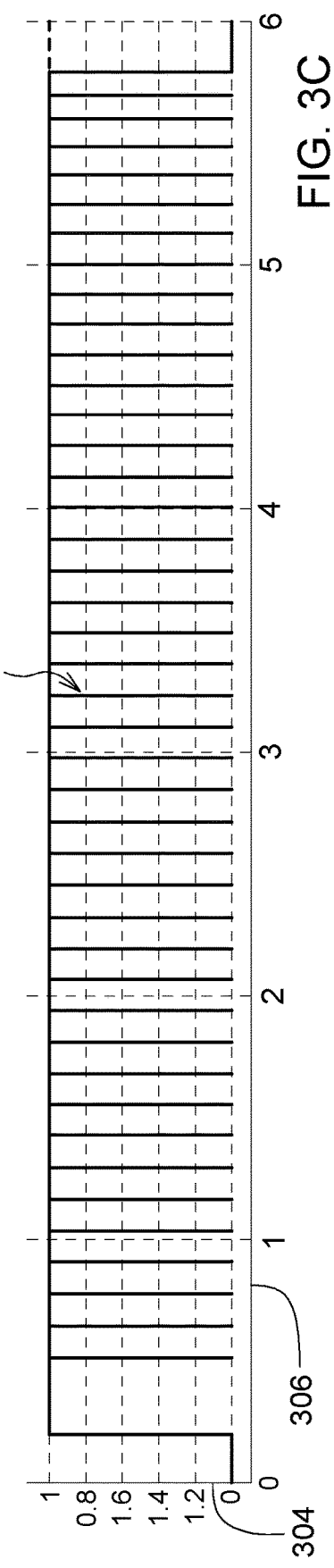

SYSTEM FOR RECOVERING ELECTRICAL ENERGY FROM MECHANICAL ROTATIONAL ENERGY OF AN ELECTRIC MACHINE AND INVERTER ASSOCIATED WITH IMPAIRED BATTERY

FIELD

This disclosure relates to a system for recovering electrical energy from mechanical rotational energy of an electric machine and inverter associated with impaired battery.

BACKGROUND

In a certain prior art an inverter may be coupled to an alternating current electric machine to control or manage the torque or rotational speed of the electric machine. To the extent that the electric machine operates in a braking mode or regenerative braking mode, the inverter requires an energy storage device, such as a battery, to dissipate rotational energy as stored electrical energy within the battery. However, if the battery fails in an open state or has a discharged state with respective high internal resistance, the inverter may lack a requisite energy storage device that is suitable for conventional (e.g., rapid) regenerative braking of the electric machine; hence, the regenerative braking of the vehicle. Further, without a fully functioning battery, the electronic circuitry that controls the inverter; hence, the electric machine may become disabled. Therefore, there is need for a system to recover electrical energy from mechanical rotational energy of an electric machine and inverter associated with an impaired battery.

SUMMARY

In accordance with one embodiment, a system for recovering electrical energy from the mechanical rotational energy of an electric machine comprises an inverter, a battery, a direct current bus capacitor, a state detector, a controller and an electric machine. An inverter comprises a high-side switch and a corresponding low-side switch. Each high-side switch and a corresponding low-side switch has a control terminal and switched terminals. A first one of the switched terminals of each high-side switch is coupled to a direct current bus terminal and a second one of the switched terminal of each high-side switch is coupled to a first one of the switched terminals of the corresponding low-side switch at a respective alternating current output terminal. A second one of the switched terminals of the corresponding low-side switch coupled to another direct current bus terminal.

The battery is coupled to the direct current bus terminals. A direct current bus capacitor is coupled in parallel across the direct current bus terminals, wherein the direct current bus capacitor generally has a capacitance that is less than three Farads. The state detector is configured to detect a first state of the battery where the battery is operational and a second state (e.g., impaired state) of the battery comprising an open state of the battery or a discharged state of the battery with a corresponding resistance that exceeds a threshold resistance.

An electric machine is coupled to at least the respective alternating current output terminal or to a plurality of alternating current output terminals of the inverter. The electric machine has a rotor with a rotational speed that is capable of, or sufficient for, converting rotational mechanical energy of the rotor into electrical energy at the direct current bus terminals until the rotational speed dissipates or declines below a critical speed. In response to the detection of an impaired state or second state of the battery, a controller is configured to provide control signals to switch or toggle the corresponding low-side switch or switches to manage: (a) the charging and discharging of the direct current bus capacitor and/or (b) the direct current (DC) bus voltage between a minimum DC voltage and a maximum DC voltage that define a range suitable for providing energy sufficient to power an electronic data processor and control logic of the controller.

BRIEF DESCRIPTION OF DRAWINGS

FIG. 3A shows a first example of a graph of rotational speed of the electric machine versus time in a rotor deceleration mode, a braking mode and/or regenerative braking mode.

FIG. 3B shows a first example of a graph of a magnitude of the DC bus voltage versus time in a rotor deceleration mode, in a braking mode and/or in a regenerative braking mode associated with an impaired battery and a DC bus capacitor of limited capacitance equal to or below 3 Farads.

FIG. 3C shows a first example of a graph of pulse width modulation signals to control the low-side switches in accordance with the graph of magnitude of the DC bus voltage versus time of FIG. 3B.

DETAILED DESCRIPTION

Figure 1:
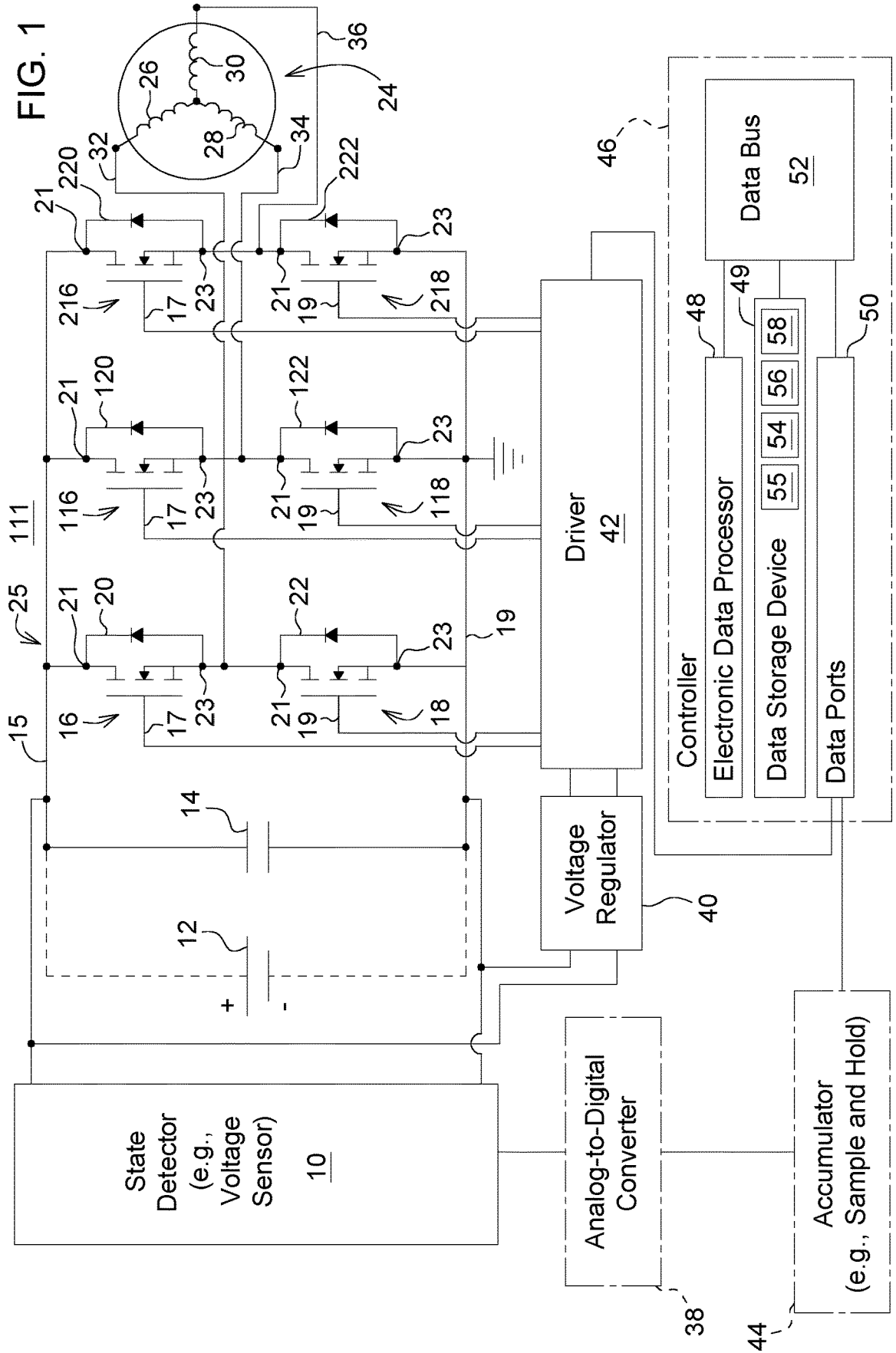
FIG. 1 is one embodiment of a block diagram of system for recovering electrical energy from mechanical rotational energy of an electric machine and inverter associated with impaired battery.

In accordance with one embodiment, FIG. 1 illustrates a system 111 for managing and/or recovering electrical energy from the mechanical rotational energy of an electric machine 24. The system comprises an inverter 25, a battery 12, a direct current bus capacitor 14, a state detector 10, a controller 46 and an electric machine 24. For each phase, an inverter 25 comprises a high-side switch (16, 116, 216) and a corresponding low-side switch (18, 118, 218). Although FIG. 1 illustrates a three-phase inverter 25 that drives or interacts with three corresponding windings (26, 28, 30) of an electric machine 24 (e.g., motor), the inverter 25 may have any number of phases or alternating current outputs equal to or greater than one.

For each phase, each high-side switch (16, 116, 216) and a corresponding low-side switch (18, 118, 218) has a control terminal 17 and switched terminals (21, 23). A first one 21 of the switched terminals (21, 23) of each high-side switch (16, 116, 216) is coupled to a direct current bus terminal 15 and a second one 23 of the switched terminal of each high-side switch (16, 116, 216) is coupled to a first one 21 of the switched terminals (21, 23) of the corresponding low-side switch (18, 118, 218) at a respective alternating current output terminal (32, 34, 36). A second one 23 of the switched terminals (21, 23) of the corresponding low-side switch (18, 118, 218) is coupled to another direct current bus terminal 19.

The battery 12 is coupled to the direct current bus terminals (15, 19). A direct current (DC) bus capacitor 14 is coupled in parallel across the direct current bus terminals (15, 19), wherein the direct current (DC) bus capacitor 14 generally has a capacitance that is less than three (3) Farads. Although the capacitor 14 is shown as single capacitor, the DC bus capacitor 14 may represent one or more capacitors that are coupled together in a network, such as capacitors that coupled together in series, in parallel or in other network configurations.

In one embodiment, a state detector 10 is configured to detect a first state of the battery 12 where the battery 12 is operational and a second state (e.g., impaired state) of the battery 12 comprising an open state of the battery 12 or a discharged state of the battery 12 with a corresponding resistance that exceeds a threshold resistance. For example, the state detector 10 may comprise one or more of the following: a state-of-charge detector, a current sensor, a voltage sensor, a resistance sensor, and/or a capacitance sensor. For example, the battery 12 may be modeled as a network of capacitance and resistance with one or more corresponding capacitance and resistance values for first state and the second state. Further, if the battery 12 is in the first state, the aggregate capacitance between the DC bus terminals includes contributions from the DC bus capacitor 14 and the battery 12, whereas if the battery 12 is in the second state, the aggregate capacitance between the DC bus terminals (15, 19) is solely or predominately associated with the DC bus capacitor 14. The second state (e.g., impaired state) may also be associated with a corresponding increase in resistance of the battery 12, such as an infinite resistance or open circuit, compared to the first state.

An electric machine 24 is coupled to the respective alternating current output terminal (e.g., for single phase configuration) or to a plurality of alternating current output terminals (32, 34, 36) of the inverter 25 (e.g., for the three-phase configuration of FIG. 1). The electric machine 24 has a windings, such as first winding 26, a second winding 28 and a third winding 30 that are coupled to corresponding ones of the phase output terminals (32, 34, 36) of the inverter 25.

In one embodiment, the state detector 10 may comprise a voltage sensor, a current sensor, or both. The state detector 10 is coupled to the DC bus terminals (15, 19), such as the capacitor terminals of capacitor 14. The detector 10 may provide a detected analog signal to an optional analog-to-digital converter 38 that converts the detected analog single to a digital signal. The optional nature of the optional analog-to-digital converter 38 is indicated by the dashed lines. For example, in an alternate embodiment the analog-to-digital converter 38 may be integral with the state detector 10. The (battery) state detector 10 is coupled to an optional accumulator 44. The accumulator 44 may comprise a register, data buffer, and/or electronic memory that holds and stores that digital signal until the digital signal can be processed by the electronic data processor 48 or controller 46.

In one embodiment, the controller 46 comprises an electronic data processing system. As illustrated in the system 111 of FIG. 1, the controller 46 comprises an electronic data processor 48, a data storage device 49 and data ports 50 that communicate with one another via a data bus 52. The electronic data processor 48 may comprise a microprocessor, a microcontroller 46, an application specific integrated circuit (ASIC), a digital signal processor (DSP), system on a chip (SOC), an programmable logic array, a logic device, an arithmetic logic unit or another data processor. The data storage device 49 may comprise electronic memory, non-volatile random access memory, a magnetic storage device, an optical storage device, a hard disk drive, or another device for storing digital or analog data. The data ports 50 may comprise a data transceiver (e.g., wireline data transceiver, such as a Universal Asynchronous Receiver Transmitter (UART)) and buffer memory.

The data storage device 49 may store one or more modules that comprise software instructions, software, libraries, and/or data files. As illustrated, the modules in the data storage device 49 may include one or more of the following: state detection module 54, mode selector 56, driver modulation module 58, and voltage limiter 55. In one embodiment, the state detection module 54 detects whether a battery 12 or inverter 25 is operating in a first state (e.g., operational state), a second state (e.g., battery 12 open state or battery 12 discharged state), or both, where the first state and the second state are mutually exclusive (e.g., cannot occur simultaneously). The mode selector 56 selects between a first mode (e.g., full operational mode, such as a pulse width modulation mode or space vector PWM mode) and a second mode (e.g., a limited mode, such as a limp-home mode). A modulation control module 58 is configured to provide one or more control data messages or control signals to the driver to control the switching states, timing, and (fundamental) frequency of the switching states based on input of the state detection module 54, the mode selector 56, or both. In the limited mode or limp-home mode, the controller 46 or modulation control module 58 instructs the driver 42 to operate, switch or toggle one or more low-side switches (18, 118, 218) to maintain a DC bus voltage on the DC bus (15, 19) that is capable of: (a) powering the controller 46 or data processing system via conversion of the rotational energy into the electric machine 24 to electric energy stored in the capacitor 14, (b) managing the storage, charging and discharging of electrical energy in the capacitor 14 to a target voltage range that is compatible providing reliable DC power to operate the controller 46 via a voltage regulator 40, and/or (c) managing the deceleration of the rotor of the electric machine by controlling the modulation of the switches (e.g., low side switches) of the inverter 25 to dissipate excess electrical energy in the windings (26, 28, 30) of the electric machine 24 with a rotating rotor.

If the battery 12 is in a second state (e.g., impaired state or open state), the electric machine 24 may have a rotor with a rotational speed that is capable of, or sufficient for, converting rotational mechanical energy of the rotor into electrical energy, which is rectified by high-side diodes (20, 120, 220) and low-side diodes (22, 122, 222) to charge the DC bus capacitor 14 and to power the controller 46, via the direct current bus terminals (15, 19): (a) for one or more successive charging intervals until the rotational speed of the rotor (e.g., coupled, directly or indirectly, to a traction drive of a vehicle) dissipates or declines below a critical speed, (b)

during capacitor charging intervals where the high-side switches are in an open state, and (c) during the capacitor charging intervals where the low side switches are in a transient, switched open state, or a toggled state. Further, if the battery 12 is in a second state (e.g., impaired state), the electric machine 24 may have a rotor with a rotational speed that produces alternating current electrical energy in one or more windings (26, 38, 30) that are controlled by the low-side switches (18, 118, 218) in a transient, switched closed state or in a toggled state: (1) to pause, cease or stop momentarily charging the DC bus capacitor 14 for a transient time interval of the switched closed state of one or more low-side switches (18, 118, 218), and/or (2) to discharge excess electrical energy in one or more windings (26, 28, 30) to ground 19 via the transient switched closed state of one or more low-side switches (18, 118, 218) during successive non-charging transient time intervals until the rotational speed dissipates or declines below a critical speed. Meanwhile, if the low-side switches are turned on or in a closed state, a significant braking force (e.g., back electromotive force) of the rotor (and any drive train that is mechanically, rotationally coupled to the drive train of a vehicle) can be created through discharging the electrical energy in one or more windings (26, 28, 30) of the electric machine 24. Collectively, the transient, switched open state and the transient switched closed state of the low-side switches (22, 122, 222) comprises a toggling or switching of the low-side switches (22, 122, 222) in accordance with on and off cycles (e.g., for managing charging and non-charging of the DC bus capacitor 12). During non-charging intervals it is possible that the capacitor is discharged by electrical load of the controller 46 or other electrical loads on the DC bus (15, 19).

In response to the detection of a second state of the battery 12, a controller 46 configured to provide control signals to switch or toggle the corresponding low-side switch (18, 118, 218) or switches to manage the charging and discharging of the direct current (DC) bus voltage between a minimum DC voltage and a maximum DC voltage that define a target range suitable for providing energy sufficient to power an electronic data processor 48 and control logic of the controller 46, via the voltage regulator 40. The target range may depend upon the digital logic levels (e.g., Transistor-transistor logic (TTL)) that are used by the electronic circuitry in the controller 48 and/or electronic data processor 38.

The controller 46 comprises a driver 42 with output terminals that are coupled to one or more control terminals 17 of the low-side switch (18, 118, 218) and the high-side switch (16, 116, 216) to control switching states of the switched terminals (21, 23) of the low-side switch (18, 118, 218) and the high-side switch (16, 116, 216). If the battery 12 is in a first state or operational state, for each phase, the controller 46 controls the low side switch (18, 118, 218) and the high-side switch (16, 116, 216) to provide a pulse-width modulation (PWM) signal, which may yield a generally sinusoidal output waveform or another output waveform at the alternating current output terminal(s) (32, 34, 36). For example, if the inverter 25 and electric machine 24 have three phases, each output waveform for a respective phase may be offset (e.g., approximately one-hundred and twenty degrees out of phase with the respect to one or more other phases). In practice the phase offset of different phases may depend upon the configuration and orientation of the windings (26, 28, 30) and magnetic poles of the electric machine 24.

If the battery 12 is in a second state, such as open state, or is detected to be in the second state, the inverter 25 or a portion of the inverter 25 may control the electric machine 24 in accordance with various procedures which may be applied separately or cumulatively. Under a first procedure, if an observed voltage level of the direct current bus (15, 19) is at or below the minimum DC bus voltage each low-side switch (18, 118, 218) is turned off or put in an off state to charge the direct bus capacitor 14. Under a second procedure, if an observed voltage level of the direct current on the DC bus (15, 19) is at or above the maximum DC bus voltage, each low-side switch (18, 118, 218) is turned on or put in an on state to discharge, pause charging, or avoid overcharging of the direct bus capacitor 14. In a third technique, if any of the low-side switches (18, 118, 218) are in the on state, a deceleration or braking force is created within the electric machine 24 that opposes its rotational motion and dissipates its rotational energy. Under a fourth procedure, if an observed voltage level of the direct current bus (15, 19) is at or below the minimum DC bus voltage, one or more low-side switches (18, 118, 218) are turned off or put in an off state to charge the direct bus capacitor 14. Under a fifth procedure, if an observed voltage level of the direct current is at or above the maximum DC bus voltage (15, 19), one or more low-side switches (18, 118, 218) are turned on or put in an on state to discharge, pause charging or avoid overcharging of the direct bus capacitor 14. Under a sixth procedure, the controller 46 is configured to provide signals to switch or toggle the corresponding low-side switch (18, 118, 218) or switches to manage the charging (e.g., and non-charging), and discharging to produce a generally saw-tooth waveform of the direct bus voltage between the minimum DC voltage (e.g., lower limit or lower limit voltage) and the maximum DC voltage (e.g., an upper limit or upper limit voltage).

As illustrated in FIG. 1, a high-side diode (20, 120, 220) is connected to the switched terminals (21, 23) of the high-side switch (16, 116, 216) and a low-side diode (22, 122, 222) is connected to the switched terminals (21, 23) of the low-side switch (18, 118, 218); further, the high-side diode (20, 120, 220) is configured to conduct a positive half-wave component of the saw-tooth waveform in the winding (26, 28, 30) of the electric machine 24 and the low-side diode (22, 122, 222) is configured to conduct the negative half-wave component of the saw-tooth waveform in the winding (26, 28, 30) of the electric machine 24 to ground 19 or a negative bus terminal. For example, the anode of the high-side diode 20 is coupled to the AC output terminal (e.g., of one phase, such as output terminals 32, 34 and 36) of the inverter 25, whereas the cathode of the upper diode is coupled to the DC voltage bus (e.g., positive terminal 15 of the DC voltage bus) and the anode of the low-side diode 22 is coupled to the DC bus voltage bus (e.g., a negative terminal 19 of the DC voltage bus), whereas the cathode of the high-side diode 20 is coupled to the AC output terminal (32, 34, 36) of the inverter 25.

In one embodiment, the DC bus capacitor 14 comprises one or more capacitors, which are connected between the DC bus terminals, to achieve a capacitance within a capacitance range of approximately 500 micro Farads to approximately 2,000 micro Farads. Alternately, the capacitance range of the capacitor 14 is less than 3 Farads. Accordingly, the above capacitance range of the capacitor 14 can be achieved by one or more electrolytic capacitors are coupled together in series, in parallel, or as a capacitive network. However, the capacitance range of the capacitor 14 does not require the greater capacitance of an ultra-capacitor or super capacitor (e.g., or a battery fully functioning in the first state)

to function properly, although the greater capacitance, the more energy that can be stored for regenerative braking or other uses.

In one embodiment, the rotor of the electric machine 24 is mechanically coupled to a wheel or track of a vehicle (e.g., off-road vehicle) during a rotor deceleration mode, a braking mode, and/or power regeneration mode to reduce the rotational speed of the rotor to the critical speed over a time interval. Further, in certain configurations the time interval has a range between approximately five seconds to approximately thirty seconds when the battery 12 is in the second state.

In some embodiments, the rotor of the electric machine 24 is mechanically coupled to a wheel or track of a vehicle during a rotor-deceleration mode, braking mode and/or a power regeneration mode to provide braking torque opposing the motion of the vehicle until the rotational speed of the rotor reaches a rotational speed approaching zero or the critical rotational speed over an interval of five seconds to thirty seconds when the battery 12 is in the second state.

The deceleration of the rotor of the electric machine 24 (e.g., electric motor or permanent magnet alternating current motor), or the vehicle associated with the electric machine 24 may be carried out in accordance with various techniques which may be applied separately or cumulatively. Under a first technique, during a deceleration of the rotor of the electric machine 24 (e.g., motor) or the vehicle associated with the motor, each low-side switch (18, 118, 218) (e.g., power field effect transistor) is toggled or switched in an auxiliary braking mode supplements or augments a hydraulic braking system, a electrohydraulic braking system, or another primary braking system of a vehicle. In an alternate embodiment, during a deceleration of the rotor of the electric machine 24 (e.g., motor) or the vehicle associated with the motor, each low-side switch (18, 118, 218) (e.g., power field effect transistor) is toggled or switched in an auxiliary braking mode to replace, substitute, and/or support (e.g., slow or gradual braking on a level surface for lightweight off-road vehicles or lightweight robots without passengers/drivers) secondary braking if there is an unavailable or failed braking system, such as hydraulic braking system, an electrohydraulic braking system, or another primary braking system of a vehicle. Under a second technique, each low-side switch (18, 118, 218) is toggled or switched at a lower frequency that is lower than a normal pulse-width modulation frequency or fundamental frequency when the battery 12 is in the first state, wherein the lower frequency reduces or limits the change in voltage versus change in time of the signal in the windings (26, 28, 30) of the electric machine 24 to prevent damage to the windings or motor. Under a third technique, each low-side switch (18, 118, 218) toggles or is switched to regulate or limit the DC bus voltage to the maximum DC bus voltage if the electric machine 24 has a rotor with a flywheel rotationally coupled to the rotor, wherein the rotor and the flywheel are associated with a system rotational inertia that is consistent with rotation of the rotor over a time period during which the DC bus voltage is regulated (e.g., by voltage regulator 40).

Figure 2:
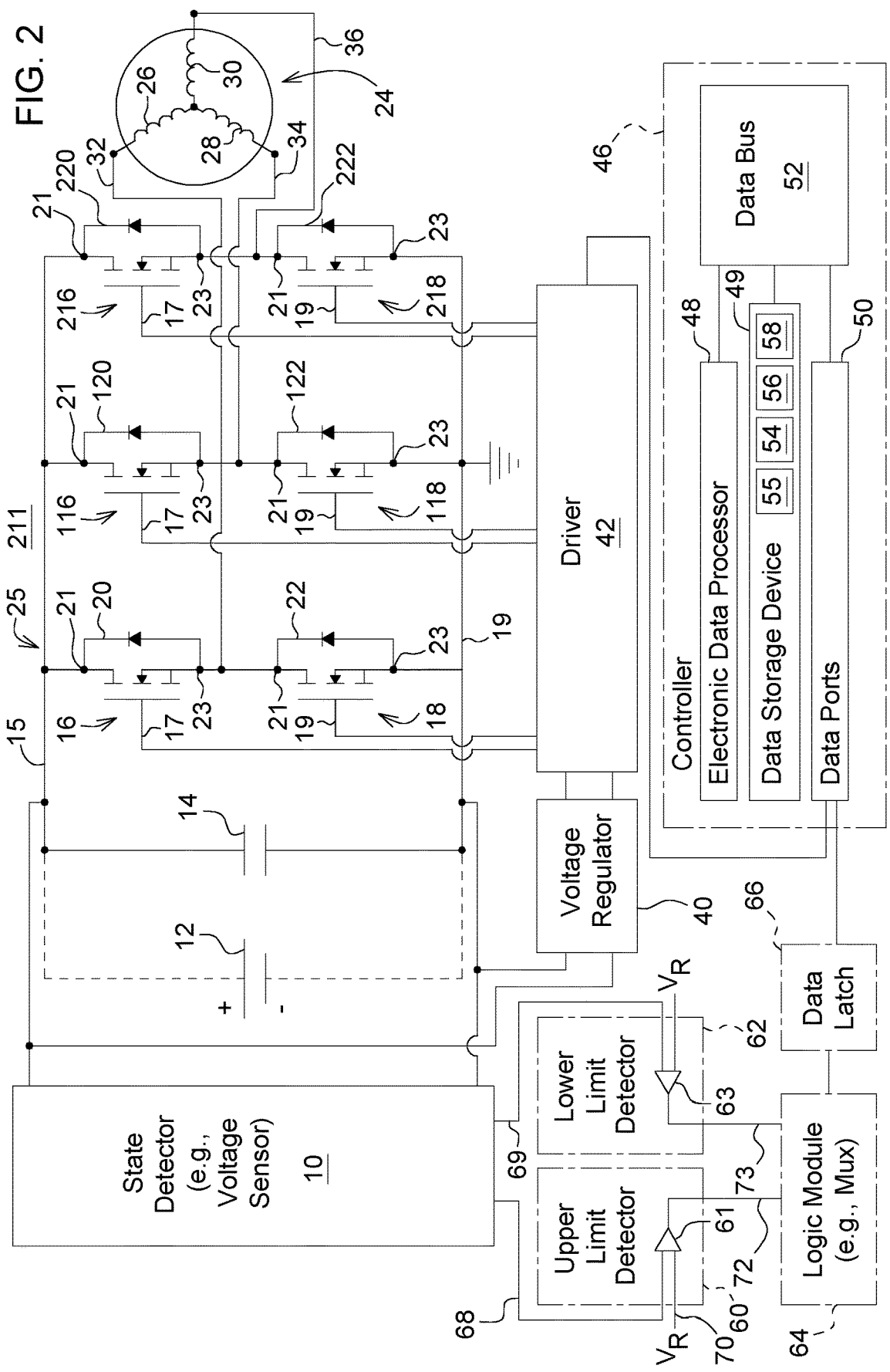
FIG. 2 is another embodiment of block diagram of the inverter and controller/driver associated with the inverter.

The system 211 of FIG. 2 is similar to the system 111 of FIG. 1, except the system of FIG. 2 replaces the optional analog-to-digital converter 38 and accumulator 44 of FIG. 1 with an upper limit detector 60, a lower limit detector 62, a logic module 64, and a data latch 66. Like reference numbers in FIG. 1 and FIG. 2 indicate like elements or features.

In one embodiment, the upper limit detector 60 comprises a first comparator 61 with a first reference voltage input 70 and a first observed voltage input 68 of the state detector 10 or voltage sensor. The logic output level (e.g., high logic level or low logic level output) at the first output 72 of the first comparator 61 indicates whether the first observed voltage input 68 is less than or equal to the first reference voltage input 70, such as an upper limit (e.g., upper voltage limit of the DC bus voltage). In one embodiment, the lower limit detector 62 comprises a second comparator 63 with a second reference voltage input 71 and a second observed voltage input 69 of the state detector 10 or voltage sensor. The logic output level (e.g., high logic level or low logic level output) at the second output 73 of the second comparator 63 indicates whether the second observed voltage input 69 is greater than or equal to the second reference voltage input 71, such as an lower limit (e.g., lower voltage limit of the DC bus voltage). The logic outputs of the upper limit detector 60, the lower limit detector 62, or both are coupled to the logic module 64. The upper limit and the lower limit may be selected based on the capacitance of the capacitor 14 and the target voltage level range required to operate the electronic circuitry of the controller 46 in a fully functional manner, for example.

In one embodiment, the logic module 64 comprises a multiplexer for selecting any of the following: (1) a first output 72 (e.g., outputted logic level) of the upper limit detector 60 or first comparator 61, (2) a second output 73 (e.g., outputted logic level) of the lower limit detector 62 or second comparator 63, or both. In another configuration, the logic module 64 comprises logic circuitry for providing a lower limit indicator (e.g., time-stamped lower limit indicator of the DC bus voltage) and an upper limit indicator (e.g., tie stamped upper limit indicator of the DC bus voltage), such as leading edge or trailing edge of a pulse that can trigger the driver 42, controller 46, or the switch modulation module 58 (e.g., pulse width modulation (PWM) module) to a change in switching state of one or more of the low-side switches (18, 118, 218) of the inverter 25 to operate in the second mode or limited mode after, during or upon detection of the second state of the battery 12.

As illustrated in FIG. 2, the data latch 66 may comprise a latch, flip-flop, a Delay (D) flip-flop, an RS flip-flop, a shift register, sequential logic devices with or without feedback, or another device for providing a sequence of lower limit indicators, upper limit indicators, or changes in switching states that are synchronized to a data clock of the controller 46 or data processing system. For example, the D flip-flop can delay the change of state of its output signal (e.g., at terminal Q) until an occurrence of next rising edge of a lock signal.

In an alternate embodiment of FIG. 2, although the upper limit detector 60, the lower limit detector 62, the logic module 64 and the data latch 66 are illustrated as discrete devices or discrete modules, the upper limit detector 60, the lower limit detector 62, the logic module and the data latch 66 may be implemented with the configurable logic or programmable logic provided in the electronic data processor 48.

FIG. 3A shows a first example of a graph or curve 308 of rotational speed of the electric machine 24 versus time in a braking mode or regenerative braking mode. The rotational speed 300 is associated with the vertical axis, whereas time 306 is associated with the horizontal axis. The time 306 is aligned and has the same scale in FIG. 3A, FIG. 3B and FIG. 3C.

FIG. 3B shows a first example of a graph of a magnitude of the DC bus voltage versus time in a rotor-deceleration mode of the electric machine 24, a braking mode or regenerative braking mode of the electric machine 24 associated with an impaired battery 12 and a DC bus capacitor 14 of limited capacitance equal to or below 3 Farads. In FIG. 3B, voltage 302 is shown on the vertical axis, whereas time 306 is shown on the horizontal axis. The solid curve and waveform 310 of FIG. 3B illustrates the DC bus voltage that results from modulation (e.g., pulse width modulation (PWM)) of the low-side switches (18, 118, 218) of the inverter 25 during a deceleration of the rotor of the electric machine 24, such as braking mode or regenerative braking mode. The dashed line 307 of FIG. 3B illustrates an ideal DC bus voltage for the rotor-deceleration mode, braking mode and/or regenerative braking mode that stops rotation (e.g., promptly) of the rotor of the electric machine 24; hence, can possibly provide braking any for a vehicle associated with the electric machine 24 that is rotationally coupled, directly or indirectly, to drive wheels of the vehicle or tracks of the vehicle.

FIG. 3C shows a first example of a graph of pulse width modulation (PWM) signals to control the low-side switches (18, 118, 218) in accordance with the graph of magnitude of the DC bus voltage versus time of FIG. 3B. In FIG. 3C, the vertical axis indicates a logic level 304 (e.g., relative voltage level) applied to the one or more control terminals 17 of the low-side switches and high-side switches. The horizontal axis indicates time 306. As illustrated, the pulse train 316 shows the logic level can range from a value between zero volts and one volt, between a logic level zero and a logic level one, between positive logic level and a negative logic level, or between any other logic levels, where the actual voltage level or current level assigned to a logic level may depend upon whether transistor-transistor logic (TTL), emitter-coupled logic (ECL), field-effect transistor logic, or other digital logic values are used. Further, the pulse train leading and rising edges of FIG. 3B are aligned with the upper limit (voltage) 312 and the lower limit (voltage) 314 of the saw-tooth waveform 310, or generally triangular waveform of FIG. 3B.

Figure 4A:
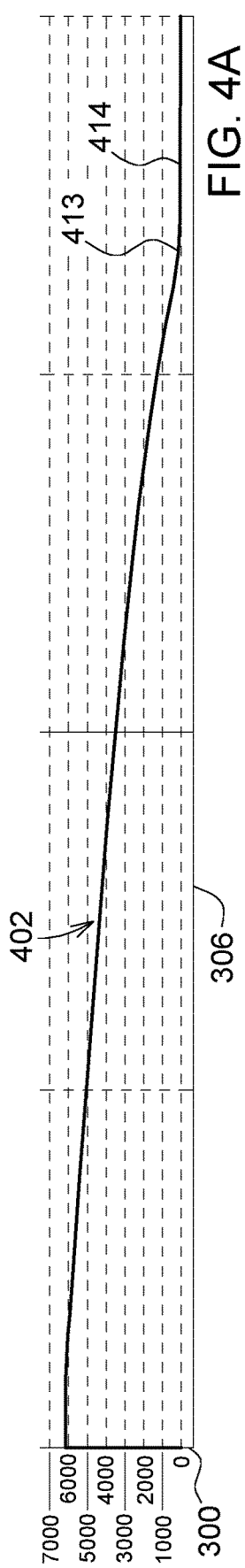
FIG. 4A shows a second example of a graph of rotational speed of the electric machine versus time in rotor deceleration mode, in a braking mode and/or regenerative braking mode.
Figure 4B:
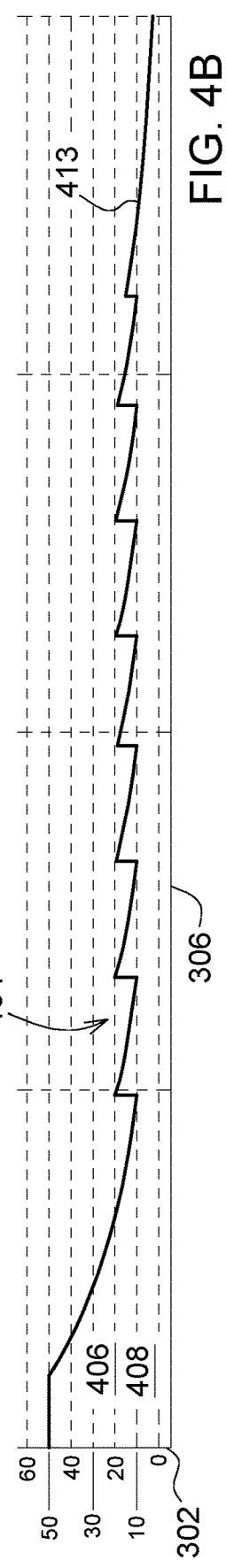
FIG. 4B shows a second example of a graph of a magnitude of the DC bus voltage versus time in rotor deceleration, braking mode and/or regenerative braking mode associated with an impaired battery and a DC bus capacitor of limited capacitance equal to or below 3 Farads.
Figure 4C:
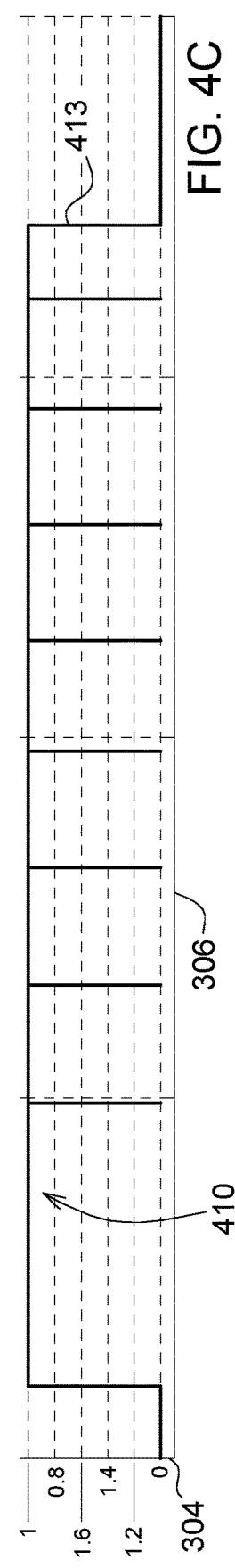
FIG. 4C shows a second example of a graph of pulse-width modulation signals to control the low-side switches in accordance with the graph of magnitude of the DC bus voltage versus time of FIG. 4B.

FIG. 3A, FIG. 3B and FIG. 3C are similar to FIG. 4A, FIG. 4B and FIG. 4C, except the frequency of the pulses or control signals applied the control terminals 17 of the low-side switches (18, 118, 218) are lower in FIG. 4C than FIG. 3C, respectively. Consequently, the frequency of the generally sawtooth waveform 404 (e.g., triangular waveform) of FIG. 4B is lower than the frequency of the generally saw-tooth waveform 310 (e.g., triangular waveform) of FIG. 3B. Meanwhile, FIG. 4A shows a second example of a graph of rotational speed 300 of the electric machine 24 versus time 306 in a rotor-deceleration mode, braking mode or regenerative braking mode. The rotational speed 300 is associated with the vertical axis, whereas time 306 is associated with the horizontal axis. The time 306 is aligned and has the same scale in FIG. 4A, FIG. 4B, FIG. 4C, and FIG. 4D. The rotational speed 300 approaches zero at a critical time 413 and then remains at a rotational speed 300 of a zero for the rotor of the electric machine 24.

FIG. 4B shows a second example of a graph of a magnitude of the DC bus voltage 302 versus time in a rotor-deceleration mode, braking mode or regenerative braking mode associated with an impaired battery 12 and a DC bus capacitor 14 of limited capacitance equal to or below 3 Farads. In FIG. 4B, voltage 302 is shown in the vertical axis, whereas time 306 is shown in the horizontal axis. The generally saw-tooth waveform 404 of FIG. 4B illustrates the DC bus voltage 302 that results from modulation (e.g., pulse width modulation (PWM)) of the low-side switches of the inverter 25) during a deceleration of the rotor of the electric machine 24, such as braking mode or regenerative braking mode.

FIG. 4C shows a second example of a graph of pulse width modulation signals to control the low-side switches (18, 118, 218) in accordance with the graph of magnitude of the DC bus voltage versus time of FIG. 4B. In FIG. 4C, the vertical axis indicates a logic level 304 (e.g., relative voltage level) applied to the one or more control terminals 17 of the low-side switches and high-side switches. The horizontal axis indicates time 306. As illustrated, the pulse train 410 shows the logic level 304 can range from a value between zero volts and one volt, between a logic level zero and a logic level one, between positive logic level and a negative logic level, or between any other logic levels, where the actual voltage level or current level assigned to a logic level may depend upon whether transistor-transistor logic (TTL), emitter-coupled logic (EML), field-effect transistor logic, or other digital logic values are used. Further, the pulse train leading and rising edges of FIG. 4C are aligned with the upper limit (voltage) 406 and the lower limit (voltage) 408 of the generally saw-tooth waveform 404, or generally triangular waveform of FIG. 4B. The pulse train 410 can end when the rotor speed reaches or approaches zero at the stopping time or zero speed time 413.

Figure 4D:
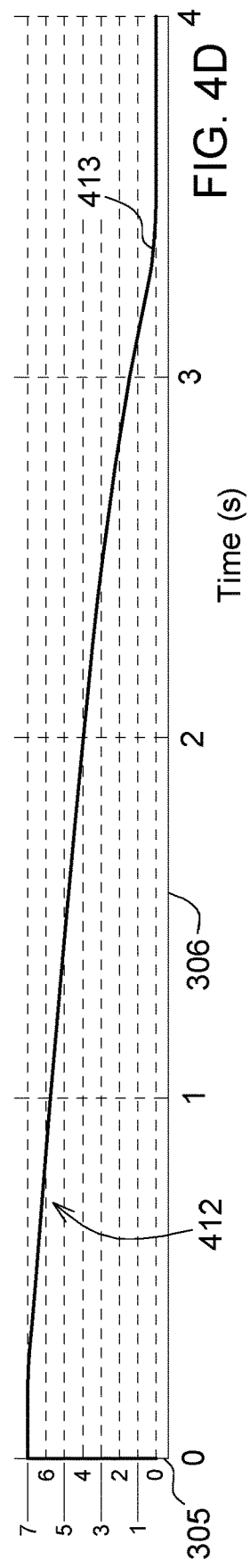
FIG. 4D shows vehicle speed versus time for an electric machine incorporated into a vehicle, or its drivetrain, where the vehicle speed is shown on the vertical axis and the time is shown on the horizontal axis.

FIG. 4D shows a vehicle speed versus time curve 412, where the vehicle speed 305 is shown on the vertical axis and the time 306 is shown on the horizontal axis. Here, the rotor of the electric machine 24 is mechanically, rotationally coupled to the wheels or tracks of the vehicle, directly or indirectly through a drivetrain. Accordingly, the braking force or regenerative braking of the rotor of the electric machine 24 has the potential to brake, stop, decelerate or oppose the motion of the vehicle with respect to the ground. In certain configurations, the braking force or regenerative braking of the rotor may supplement a primary braking system of the vehicle, such as a hydraulic braking system, an electrohydraulic braking system, a cable, mechanical braking system, or an electromechanical braking system.

If a battery 12, ultracapacitor or supercapacitor (e.g., having a capacitance equal to or greater than 100 Farads) on the DC voltage (15, 19) bus fails as an open circuit, such as in the second state, the driver 4 and associated electronic data processor 48 may not be available to control the inverter 25, the electric machine 24, or both. Therefore, for such open circuit failures of the battery 12, ultracapacitor or supercapacitor (e.g., having a capacitance equal to or greater than 100 Farads), standard regenerative-braking operation (braking torque) of the vehicle and the battery 12 is not available to be recharged to dissipate energy from the electric machine (e.g., motor) in the regenerative braking mode, while slowing the motor and vehicle. The electric machine 24 is typically coupled to the drive wheels directly, or indirectly via a transmission or gearbox to gain mechanical advantage in a regenerative braking mode.

In accordance with this disclosure, if a battery 12, ultracapacitor or super capacitor (e.g., having a capacitance equal to or greater than 100 Farads), in parallel on the DC voltage bus fails as an open circuit, the circuit enters into an auxiliary braking mode that can operate in the absence of the gate driver 42 or its data processor having an adequate DC voltage from the failed battery. A small battery or other power source may be required to run a timer or comparator circuitry of the upper limit detector 60 and the lower limit detector 62, or the driver 42 with voltage lockout feature in the alternate configuration. In the auxiliary braking mode, the high-side switches (20, 120, 220) of the inverter 25 are set to off (e.g., by biasing the gates) and the low-side switches (18, 118, 218) may be coupled to: (a) the output of a timer, which comprises a suitable oscillator or control circuit, or set of comparators, or (b) to the output of comparators (e.g., 61, 63) that toggle the low-side switches (18, 118, 218) on and off based on the observed voltage level of the DC bus to maintain the voltage or charge state of the DC bus capacitor within a target range. The target range can be defined by a lower threshold voltage (e.g., lower limit) and a higher threshold voltage (e.g., upper limit). If the observed voltage level of the DC bus is below a lower threshold voltage, the low-side switches (18, 118, 218) are turned off. Further, if the low-side switches of the inverter 25 are turned off, the low-side diode (22, 122, 222) conducts the negative half-wave in the motor windings (26, 28, 30) to ground 19 and the high-side diode (20, 120, 220) conducts the positive half-wave of the motor windings (26, 28, 30) to charge the capacitor 12 to support a power regenerative-braking mode (e.g., back-EMF) and associated back EMF that tends to slow the motor rotation. However, if the observed voltage level of the DC bus is above a high threshold voltage (e.g., upper limit), the low-side switches (18, 118, 218) are turned on. If one or more of the low-side switches are turned on simultaneously, or sequentially, the windings (26, 28, 30) of the electric machine 24 are shorted or connected to ground 19 to avoid over-charging of the DC bus during the power regenerative mode to maintain the DC capacitor voltage of capacitor 14 within the target range that supports the regenerative braking mode. In one configuration, if each of the low-side switches are turned on simultaneously, or sequentially, ones of the corresponding windings (26, 28, 30) of the electric machine 24 are shorted or connected to ground 19 to avoid over-charging of the DC bus during the power regenerative mode to maintain the DC capacitor voltage of capacitor 14 within the target range that supports the regenerative braking mode. For example, when or more low side switches (e.g., all of the low-side switches) are turned on, the motor back-EMF is discharged to ground 19 instead of into the capacitor 14.

In an alternate embodiment, when the low-side switches are turned on only in the auxiliary braking mode, a resistive load or variable resistance is switched between ground 19 and the low side switches (18, 118, 218) to limit current in the stator windings and further define the shape of the sawtooth waveform; particularly when the temperature of the stator or winding (26, 28, 30) exceeds a threshold temperature, as indicated by a temperature sensor mounted on the electric machine 24 or in thermal communication with the windings of the electric machine.

In another alternate embodiment, the same or similar functionality, as described in conjunction with FIG. 1 and FIG. 2, can be realized by the undervoltage lockout feature of a driver 42. The undervoltage lock-out feature may have the comparators built in to evaluate observed DC bus voltage to provide the control signals to each gate to achieve the same or substantially similar control described in conjunction with FIG. 2 to manage charging and discharging of the DC bus capacitor 14 with a half-wave rectifier configuration of the diodes (20, 120, 220, 22, 122, 222) that supports auxiliary or back-up braking where the DC bus battery fails as an open circuit.

In yet another alternate embodiment, the low-side switches (18, 118, 218) of the inverter 25 are switched or toggled (at lower frequency then normal PWM fundamental frequency that does not produce high dv/dt that might otherwise damage the windings (26, 28, 30)). In one embodiment, there may be a limiter (or delay module) that limits the maximum toggle frequency to protect the windings and temperature sensor that controls a current limiter to limit current in the stator windings during power regenerative mode to avoid demagnetization of motor windings.

Having described one or more embodiments, it will become apparent that various modifications can be made without departing from the scope of the invention or disclosure as defined in the accompanying claims.

The invention claimed is:

1. A system for recovering electrical energy from the mechanical rotational energy of an electric machine, the system comprising:
   an inverter comprises a high-side switch and a corresponding low-side switch, each high-side switch and a corresponding low-side switch having a control terminal and switched terminals, a first one of the switched terminals of each high-side switch coupled to a direct current bus terminal and a second one of the switched terminal of each high-side switch coupled to a first one of the switched terminals of the corresponding low-side switch at a respective alternating current output terminal, a second one of the switched terminals of the corresponding low-side switch coupled to another direct current bus terminal;
   a battery coupled to the direct current bus terminals;
   a direct current bus capacitor coupled in parallel across the direct current bus terminals, wherein the direct current bus capacitor has a capacitance that is less than three Farads;
   a detector for detecting a first state of the battery where the battery is operational and a second state of the battery comprising an open state of the battery or a discharged state of the battery with a corresponding resistance that exceeds a threshold resistance;
   an electric machine coupled to at least the respective alternating current output terminal or to a plurality of alternating current output terminals of the inverter, the electric machine having a rotor with a rotational speed capable of converting rotational mechanical energy of the rotor into electrical energy at the direct current bus terminals until the rotational speed dissipates or declines below a critical speed; and
   in response to the detection of a second state of the battery, a controller configured to provide control signals to switch or toggle the corresponding low-side switch or switches to manage the charging and discharging of the direct current (DC) bus voltage between a minimum DC voltage and a maximum DC voltage that define a range suitable for providing energy sufficient to power an electronic data processor and control logic of the controller.

2. The system according to claim 1 wherein the controller comprises a driver with output terminals that are coupled to one or more control terminals of the low-side switch to control switching states of the switched terminals of the low-side switch, where if an observed voltage level of the direct current bus is at or below the minimum DC bus voltage each low side switch is turned off or put in an off state to charge the direct bus capacitor and where if an observed voltage level of the direct current is at or above the maximum DC bus voltage each low-side switch is turned on or put in an on state to discharge or avoid overcharging of the direct bus capacitor.

3. The system according to claim 2 wherein the when any ones of the low-side switches are in the on state a braking force is created within the electric machine that opposes its rotational.

4. The system according to claim 1 wherein the controller is configured to provide signals to switch or toggle the corresponding low-side switch or switches to manage the charging and discharging to produce a saw-tooth waveform of the direct bus between the minimum DC voltage and the maximum DC voltage.

5. The system according to claim 1 wherein a high-side diode is connected to the switched terminals of the high-side switch and wherein a low-side diode is connected to the switched terminals of the low-side switch; wherein the high-side diode is configured to conduct a positive half-wave component of the saw-tooth waveform in the motor winding and the low-side diode is configured to conduct the negative half-wave component of the saw-tooth waveform in the motor winding to ground or a negative bus terminal.

6. The system according to claim 1 wherein the capacitance is within a capacitance range of 500 micro Farads to 2,000 micro Farads.

7. The system according to claim 1 wherein the rotor of the electric machine is mechanically coupled to a wheel or track of a vehicle during a braking mode or power regeneration mode to reduce the rotational speed of the rotor to the critical speed over a time interval.

8. The system according to claim 7 wherein the time interval has a range between approximately five seconds to approximately thirty seconds when the battery is in the second state.

9. The system according to claim 1 wherein the rotor of the electric machine is mechanically coupled to a wheel or track of a vehicle during a braking mode or a power regeneration mode to provide braking torque opposing the motion of the vehicle until the rotational speed of the rotor reaches a rotational speed approaching zero or the critical rotational speed over an interval of five seconds to thirty seconds when the battery is in the second state.

10. The system according to claim 1 wherein each low-side switch is toggled or switched in an auxiliary braking mode that supplements or augments a hydraulic braking system or electrohydraulic braking system of a vehicle.

11. The system according to claim 1 wherein each low-side switch is toggled or switched at a lower frequency that is lower than a normal pulse-width modulation frequency or fundamental frequency when the battery is in the first state, wherein the lower frequency reduces or limits the change in voltage versus change in time of the signal in the windings of the electric machine.

12. The system according to claim 1 wherein each low-side switch is toggles or switched to regulate or limit the DC bus voltage to the maximum DC bus voltage if the electric machine has a rotor with a flywheel rotationally coupled to the rotor, wherein the rotor and the flywheel are associated with a system rotational inertia that is consistent with rotation of the rotor over a time period during which the DC bus voltage is regulated.

* * * * *